(12) United States Patent
Natarajan et al.

(10) Patent No.: US 9,224,061 B1
(45) Date of Patent: Dec. 29, 2015

(54) TEXT ORIENTATION ESTIMATION IN CAMERA CAPTURED OCR

(71) Applicant: Amazon Technologies, Inc., Reno, NV (US)

(72) Inventors: Pradeep Natarajan, Lexington, MA (US); Avnish Sikka, Acton, MA (US); Rohit Prasad, Acton, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/464,365

(22) Filed: Aug. 20, 2014

Related U.S. Application Data (60) Provisional application No. 62/028,674, filed on Jul. 24, 2014.

(51) Int. Cl.
 *G06K 9/48* (2006.01)
 *G06K 9/32* (2006.01)
 *G06K 9/46* (2006.01)

(52) U.S. Cl.
 CPC ............ *G06K 9/3208* (2013.01); *G06K 9/325* (2013.01); *G06K 9/3283* (2013.01); *G06K 9/4638* (2013.01)

(58) Field of Classification Search
 CPC ... G06K 9/3208; G06K 9/325; G06K 9/3283; G06K 9/4638
 See application file for complete search history.

(56) References Cited

U.S. PATENT DOCUMENTS

| | | | | |
|---|---|---|---|---|
| 6,298,157 B1 * | 10/2001 | Wilensky | ............... | G06T 3/403 382/199 |
| 6,456,727 B1 * | 9/2002 | Echizen | ............... | G06T 1/0064 382/100 |
| 2011/0310246 A1 * | 12/2011 | Hornabrook | ........... | G01N 21/87 348/142 |

OTHER PUBLICATIONS

Ballard, D. H. Generalizing the Hough Transform to Detect Arbitrary Shapes. Pattern Recognition, vol. 13, No. 2: pp. 111-122, 1981.
Epshtein, B., et al. Detecting Text in Natural Scenes with Stroke Width Transformation. CVPR, pp. 2963-2970, 2010.
Louloudis, G., et al. Text Line Detection in Unconstrained Handwritten Documents Using a Block-Based Hough Transform Approach. 9th International Conference on Document Analysis and Recognition (ICDAR '07), pp. 599-603, Curitiba, Brazil, Sep. 2007.
Louloudis, G., et al. A Block-Based Hough Transform Mapping for Text Line Detection in Handwritten Documents. 10th International Workshop on Frontiers in Handwriting Recognition (IWFHR 2006), pp. 515-520, La Baule, France, Oct. 2006.
Saha, et al. A Hough Transform Based Technique for Text Segmentation. Journal of Computing, vol. 2, No. 2: pp. 134-141, Feb. 2010.

* cited by examiner

*Primary Examiner* — Brian Le
(74) *Attorney, Agent, or Firm* — Seyfarth Shaw LLP; Ilan N. Barzilay; David A. Klein (57) ABSTRACT

A system estimates text orientation in images captured using a handheld camera prior detecting text in the image. Text orientation is estimated based on edges detected within the image, and the image is rotated based on the estimated orientation. Text detection and processing is then performed on the rotated image. Non-text features along a periphery of the image may be sampled to assure that clutter will not undermine the estimation of orientation.

19 Claims, 11 Drawing Sheets

Boundary image 313

TEXT ORIENTATION ESTIMATION IN CAMERA CAPTURED OCR

PRIORITY CLAIM

Priority is claimed to U.S. Provisional Patent Application 62/028,674, filed Jul. 24, 2014 and entitled "TEXT ORIENTATION ESTIMATION IN CAMERA CAPTURED OCR," the entirety of which is incorporated herein by reference.

BACKGROUND

Electronic devices may perform image processing on captured images to identify and recognize the contents of the image. The accuracy of such systems depends in part upon how much visual clutter is included in a captured image.

BRIEF DESCRIPTION OF DRAWINGS

For a more complete understanding of the present disclosure, reference is now made to the following description taken in conjunction with the accompanying drawings. The figures and their relative proportions are not drawn to scale.

DETAILED DESCRIPTION

Optical character recognition (OCR) in images captured using hand held cameras is a challenging problem. The first step of the conventional approach is to detect the regions in a captured image that contain text. A typical approach for detecting text is to first identify possible regions containing text, aggregate the regions to sequences (e.g., aggregate letters into words), remove regions not belonging to any sequence as false detections, binarize the region sequences, and then performing OCR on the binarized image. Such approaches work only for text where the lines are largely horizontal and can fail when the text is at other angles. Hough transforms are one approach for detecting lines of text in document images, and may be used to determine if the sequences of detected text are arranged in a vertical or off-angle orientation. However, such approaches are not robust in natural scenes that may contain edge clutter produced by non-text objects.

Figure 1:
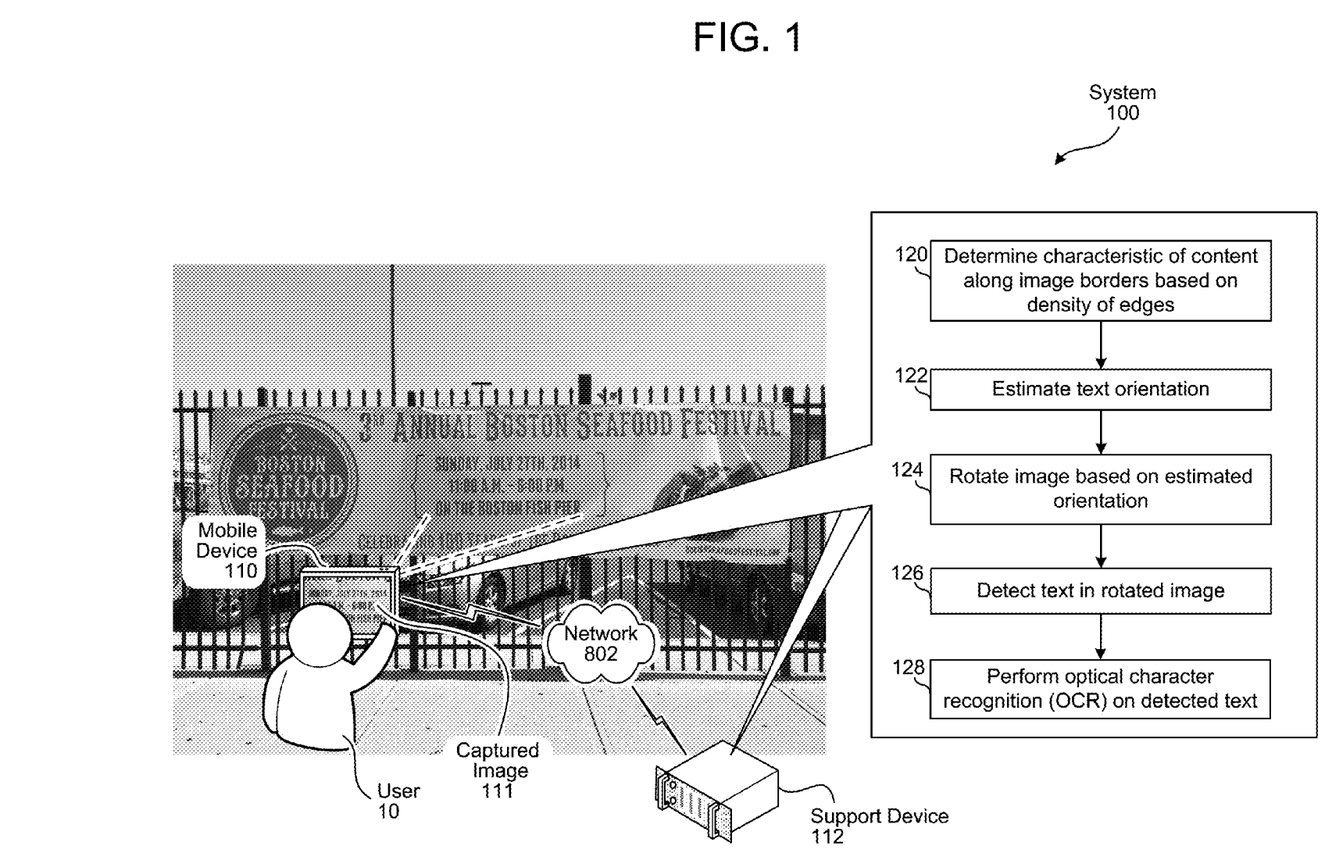
FIG. 1 illustrates a system for estimating text orientation in a captured image prior to detecting and recognizing the text.

FIG. 1 illustrates a system 100 that estimates text orientation in a captured image prior to identifying regions potentially containing text, and offers overall improvement in computationally efficient, speed, and robustness in comparison to conventional orientation correction techniques.

After a user 10 captures an image 111 on a mobile device 110, the image is processed by the mobile device 110 and/or a support device 112, such as a server connected to the mobile device 110 via a network 802.

The process comprises determining a characteristic of content (120) along the border of an image based on a density of edges to determine whether clutter is present that may interfere with orientation estimation. If the estimated clutter is below a threshold, text orientation is estimated (122), the image is rotated (124) based on the estimate, and then text is detected (126) in the rotated image, and recognized (128) by applying OCR. The determination of characteristics along the edges and (120) and estimation of text orientation (122) may be performed as part of separate text processing pipelines, as each may improve the efficiency of their respective pipeline. For example, step 120 may be added to improve a prior art system, and step 122 may be performed without step 120. However, there can be efficiencies gained by performing both steps in a same processing pipeline.

Figure 2:
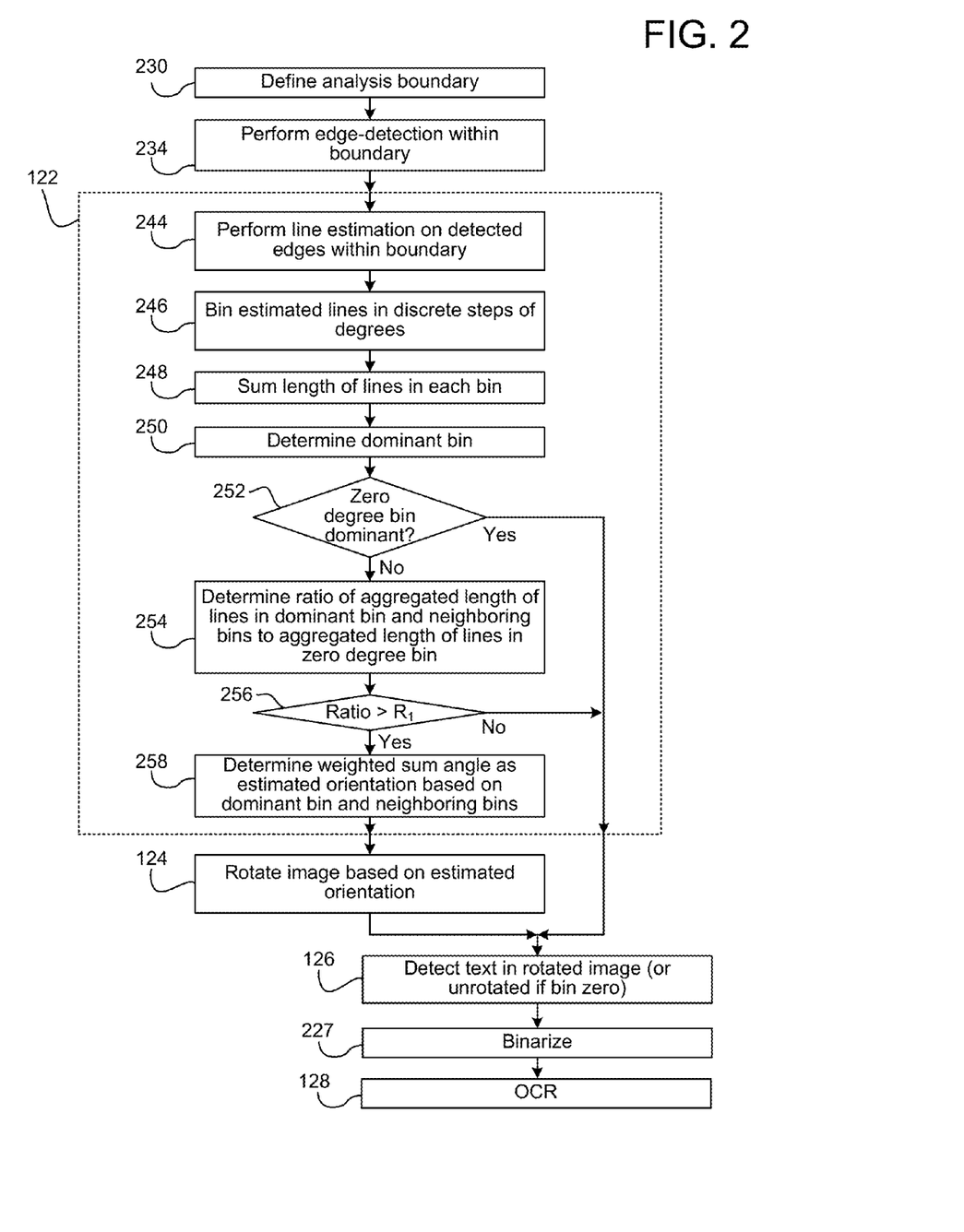
FIG. 2 illustrates a process for estimating text orientation in a captured image prior to detecting and recognizing the text.

FIG. 2 elaborates on the steps illustrated in FIG. 1, but omits step 120. The process in FIG. 2 will be discussed in conjunction with the images included in FIGS. 3A to 3E, which illustrate various steps in the process.

Figure 3A:
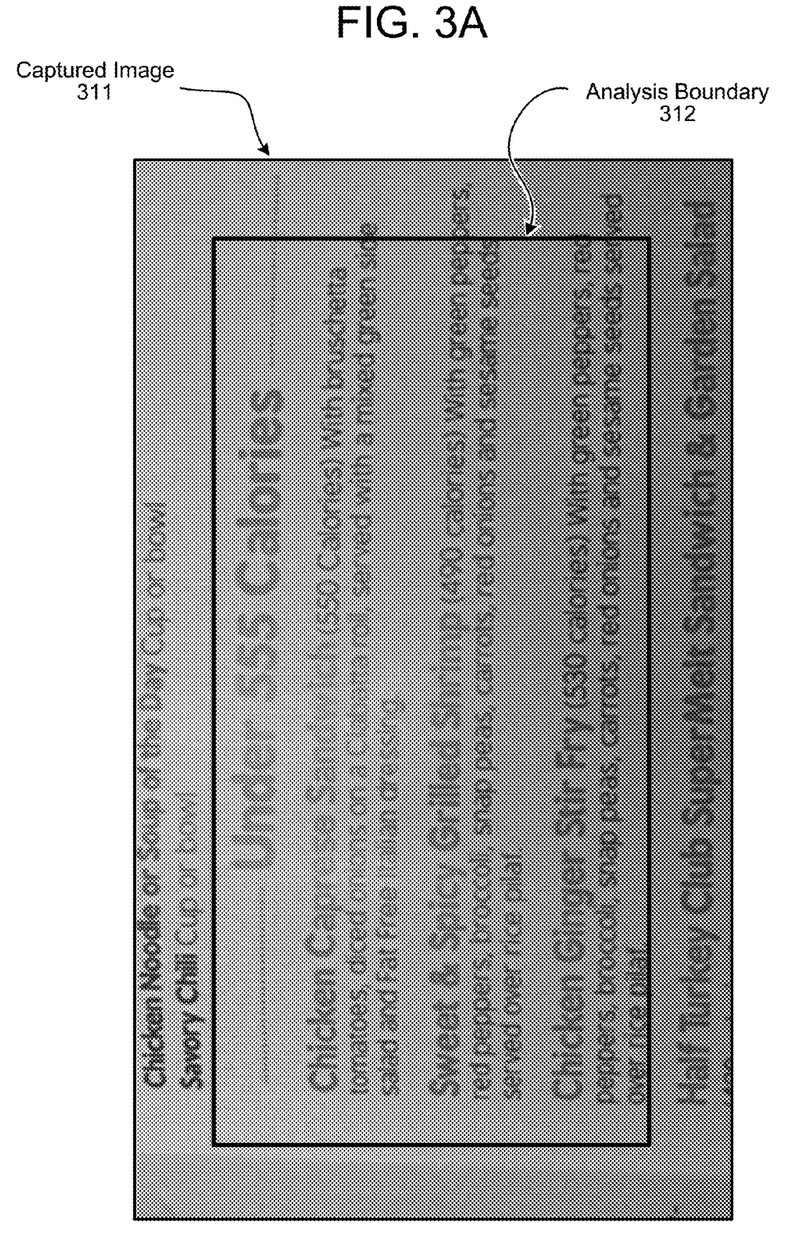
FIGS. 3A to 3E are example images illustrating steps in the process in FIG. 2 applied to an image.
Figure 3B:
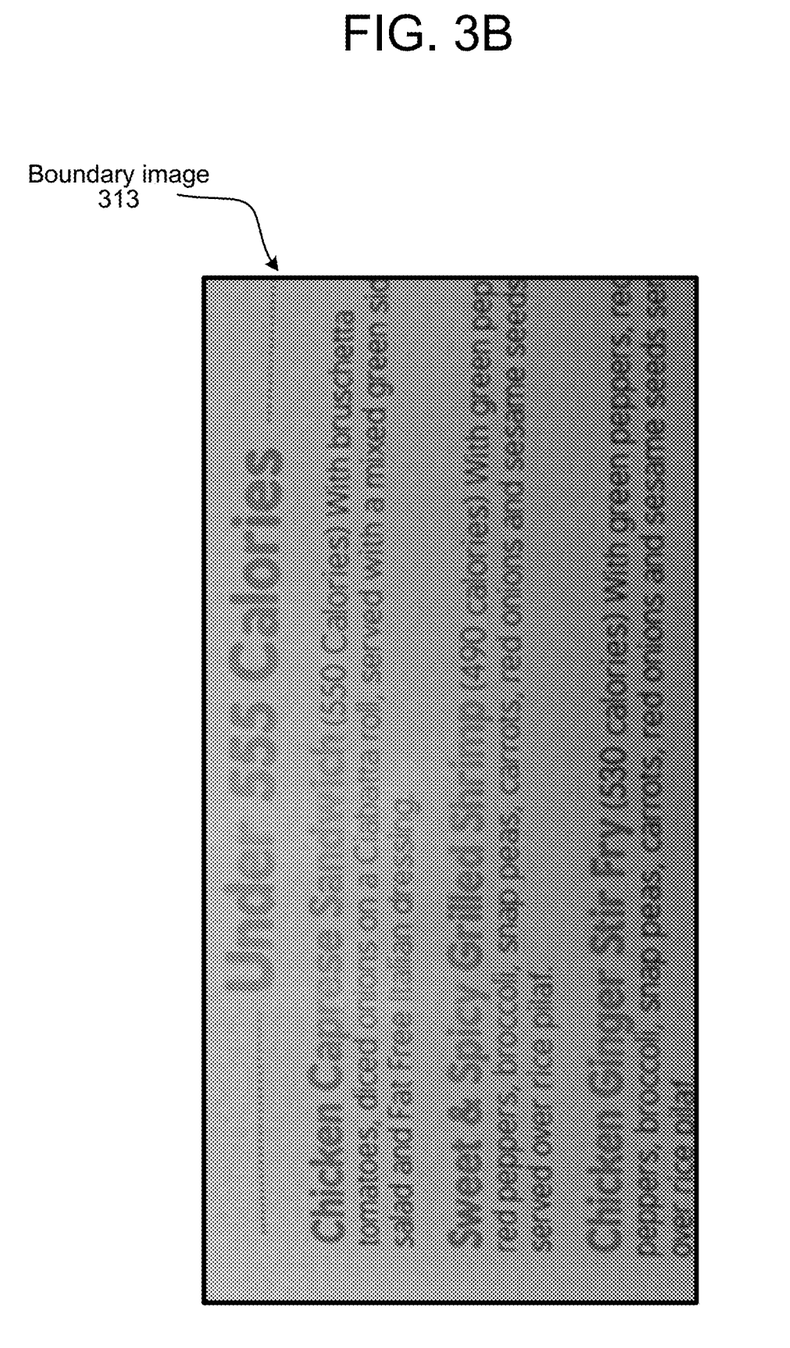

As an initial step, an analysis boundary region is defined (230) within the captured image. Ordinarily when a user captures an image containing text that they are interested in, it can be assumed that the text of interest will not be positioned at the margins of the captured image. Moreover, when a user frames an image for capture, visual clutter is more likely to be along the edges than proximate to the point or points of focus, which can be assumed to occur toward the interior of the image. Therefore, as illustrated in FIG. 3A, an analysis boundary 312 is defined within the captured image 311. The size of the boundary 312 may vary or be fixed, and may be set based on a percentage or number of pixels. For example, the analysis boundary 312 may crop between ten and twenty-five percent of the image 311 on each side. The specific percentage may be preset, or may be adjusted based on, among other things, the resolution of the image. As another example, a fixed number of pixels may be cropped, such as strips of twenty-five pixels along each side. As another example, the captured image may be downscaled to reduce computational complexity, such as downscaling the image to a fixed height of one hundred pixels while maintaining the aspect ratio of the original image 311, and then cropped by twenty five pixels off each side after downscaling. The coordinates of the boundary 312 may be used to specify the area of the captured image 311 to be processed, or as illustrated in FIG. 3B, the image within the boundary 312 may be extracted as a boundary image 313 for analysis.

Downscaling the image 311 to a fixed height (or fixed width) prior to processing, while maintaining the aspect ratio, offers advantages such as speeding up the text orientation estimation process and normalizing image processing time (e.g., makes file sizes more predictable, provides more consistent results using fixed-pixel cropping constants).

Returning to FIG. 2, edge detection is performed (234) on the image. Depending upon the edge detection technique used, if the image is color, it may be converted to greyscale prior to edge detection. A conventional edge detection algorithm may be used, such as Canny edge detection. A background discussion of Canny edge detection may be found, among other places, in: Canny, John, "A Computational Approach To Edge Detection," IEEE Transactions on Pattern Analysis and Machine Intelligence, 8(6):679-698, 1986, which is incorporated herein by reference. Numerous improvements have been made on Canny edge detection since publication of the 1986 paper, and other edge detection algorithms may also be used.

Figure 3C:
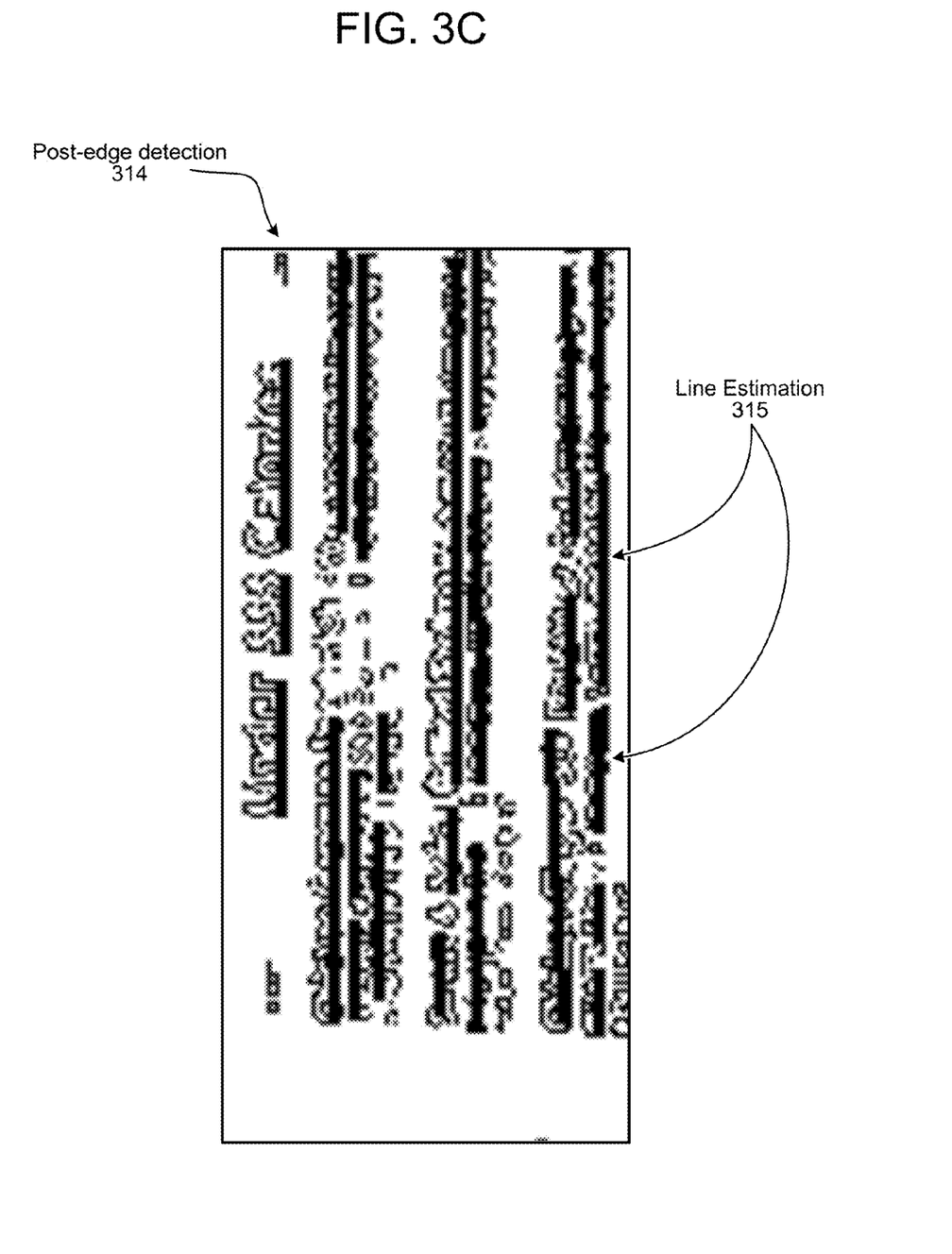
Figure 3D:
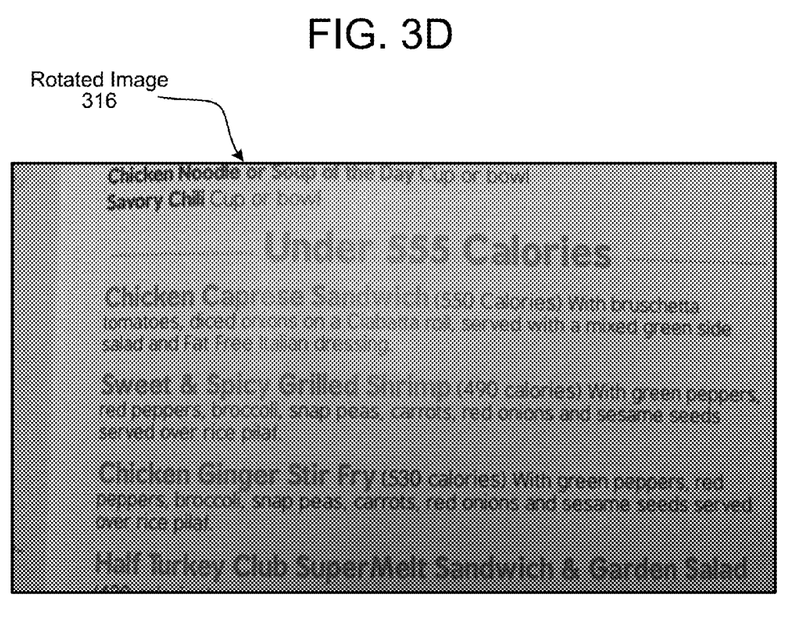
Figure 3E:
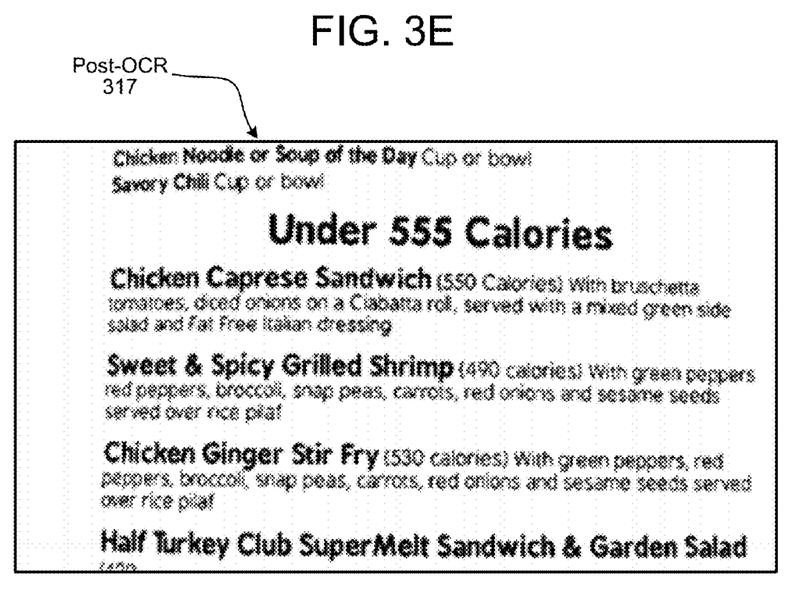

Line estimation (244) is then performed on the edge-detected image by applying a Hough transform. A background discussion of Hough transforms in existing systems that identify the text prior to application of the Hough transform may be found, among other places, in: Saha, Satadal et al., "A Hough Transform based Technique for Text Segmentation," Journal of Computing, 2(2): 134-141, 2010, which is incorporated herein by reference. In the present system 100, however, the Hough transform is applied to the edge-detected image without determining the location of the text. FIG. 3C illustrates a plurality of line estimations 315 generated by the Hough transform based on edges in the edge-detected image 314.

The orientation angle of each line is determined, and each line is assigned (246) to a discrete quantized "bin" associated with a range of angles. For example, each bin may span fifteen degrees, although a different quantization value (e.g., ten degrees) may be used. So, for example, lines 315 with an angle between negative seven-point-five and positive seven-point-five degrees will be assigned to a quantized zero degree bin ("bin zero"), lines 315 with an angle between positive seven-point-five and twenty-two-point-five degrees will be assigned to a quantized fifteen degree bin, and so on. Other binning arrangements are possible. A histogram of line occurrences at different orientations may be generated as a result of binning.

The sum of the length of lines (248) is calculated for each bin. The length of each line, as output by the Hough transform, may be stored in its respective bin, and/or as a new line is added to a bin, the length of the new line may be added to a sum of lengths of lines already assigned to the bin (e.g., a running total of lengths for each bin).

When binning is complete, the bin with the largest sum of line lengths is identified (250) as the dominant bin. If the dominant bin is an the zero degree bin (252 "Yes"), then rotation of the image may be skipped as the text in the image is likely to be in an orientation conducive to OCR or other text processing. Otherwise (252 "No"), the sum of the length of lines in the dominant bin and its two neighboring bins are added together to determine an aggregated length, and a ratio is determined (254) for the aggregated length to the sum of the length of lines in the zero degree bin (i.e., the aggregated length is divided by the sum length in the zero degree bin).

If the ratio is above a threshold $R_1$ (256 "Yes"), then there should be sufficient angle information in the dominant bin and its neighbors to provide an accurate estimated orientation. The estimated orientation may be computed (258) as a weighted sum angle based on the length of lines in the dominant bin, the lesser-angle neighboring bin, and the greater-angle neighboring bin. Specifically, the estimated orientation may be set to the ((quantized angle of the dominant bin times the sum-length of lines in the dominant bin) plus (the quantized angle of the lesser-angle neighboring bin times the sum-length of lines in the lesser-angle bin) plus (the quantized angle of the greater-angle neighboring bin times the sum-length of lines in the greater-angle bin)) divided by a sum total of the length of lines in the lesser-angle, dominant, and greater-angle bins.

Then the original captured image 311 is rotated (124) based on the estimated orientation, thus making the orientation of the image text more conducive to further processing. After rotation, the rotated image may be processed to identify text in the image (126) (e.g., using maximally stable extremal regions (MSERs) and a trained classifier), the regions identified as containing text may be binarized (227) (i.e., converted so as to have one-bit per pixel), and OCR techniques are applied (128) to detect and recognize text in the rotated captured image. Steps 126 and 227 may also be part of the OCR process.

If the ratio (determined at step 254) is below or equal to the threshold $R_1$ (256 "No"), then image rotation may be skipped and the text detection (126), binarization (227), and OCR process (128) may performed on the original captured image 311.

The text detection (126) and OCR process (128) may reuse some of the image processing performed in earlier steps, such as edge-detection (234) depending upon the particular text detection and OCR techniques used and/or the distribution of processing between the mobile device 110 and the network-connected support device 112.

As an example of distributed processing, which will be discussed further below in connection with FIG. 8, image capture and the estimation of text orientation (122) may be performed on the mobile device 110, whereas image rotation (124), detection of text (126), and/or OCR processing (126) may be performed on the network-connected support device 112.

Figure 4:
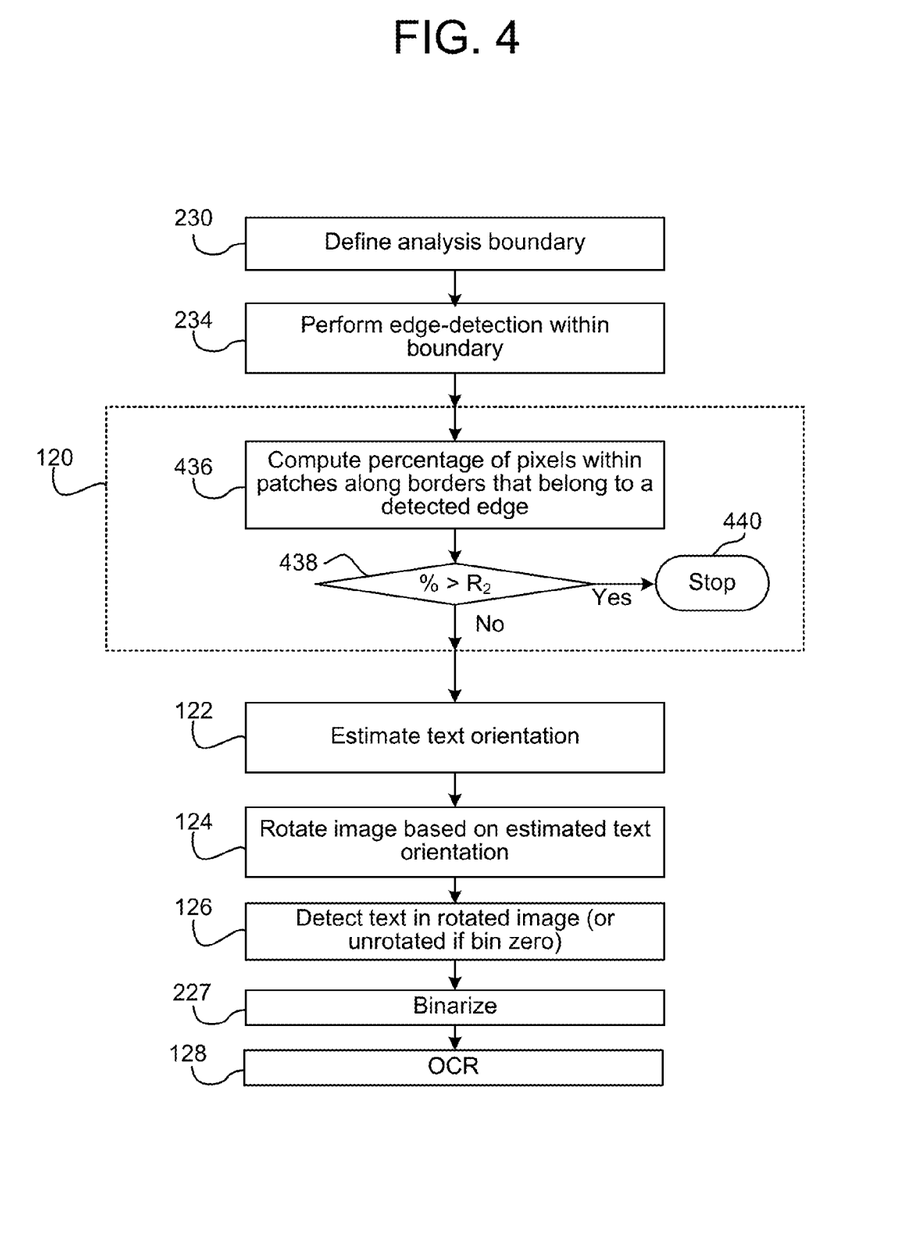
FIG. 4 illustrates a process that may be added to that in FIG. 2 to estimate non-text content in an image.
Figure 5A:
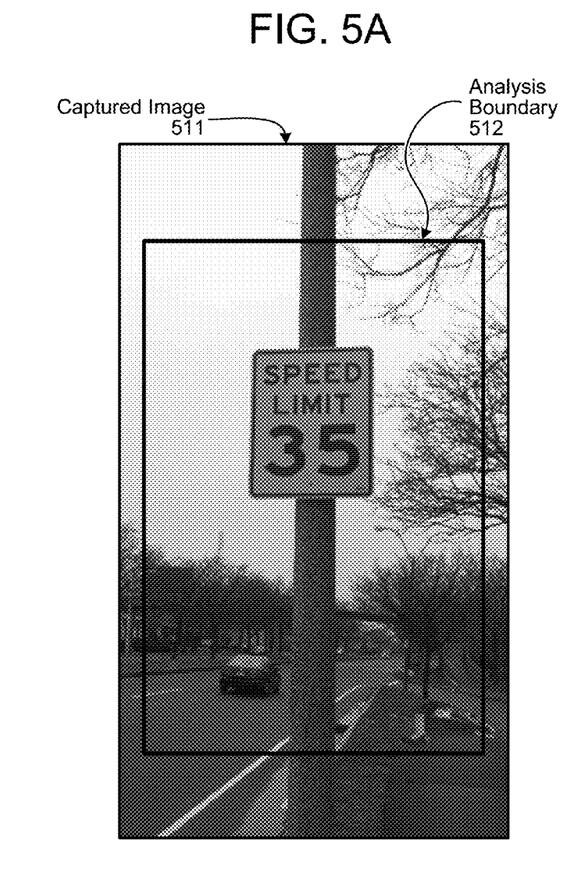
FIGS. 5A and 5B are example images illustrating steps in the process in FIG. 4.
Figure 5B:
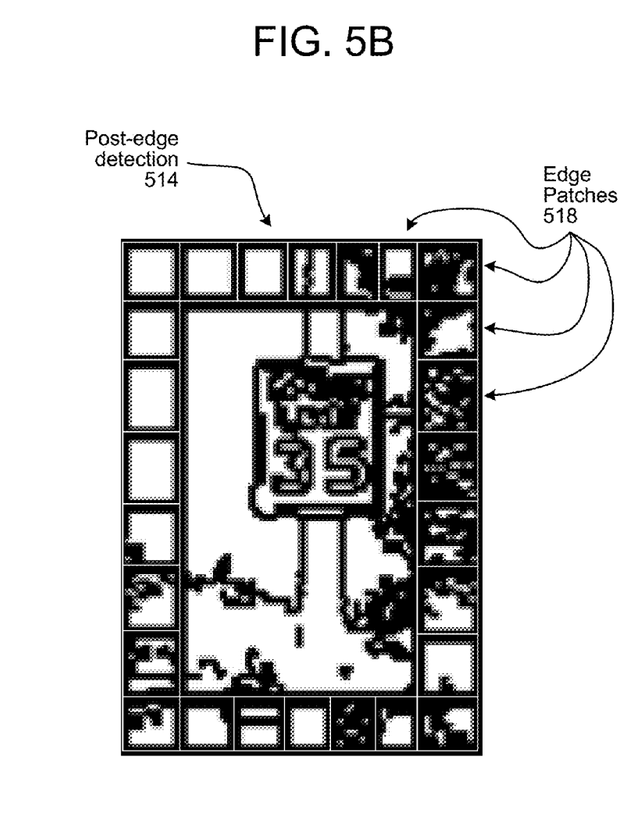

FIG. 4 adds the estimation of non-text content (120) in the captured image to the process illustrated in FIG. 2. FIGS. 5A and 5B illustrate examples of the process steps in FIG. 4 on a captured image.

In illustrated in FIG. 5A and, as discussed with FIG. 2, an analysis boundary 512 is defined (230) for the captured image 511. Edge-detection is performed (234) within the boundary.

Then, in order to determine characteristics of content along the image borders (within the analysis boundary 512), a density of edges along the borders is determined. Specifically, a series of edge patches 518 are analyzed around a periphery of the post-edge detection image within the analysis boundary 512. Each edge patch may have a uniform shape such as a square, so that each patch 518 may contain a same number of pixels (although such uniformity is not required). Excess pixels may be added to squares if there are excess pixels. For example if the width of the squares is set to five pixels by five pixels, and the width of the image 514 is fifty seven pixels wide, two extra pixels may be added to a box along the top and a box along the bottom. The number of patches along each edge may be determined, among other ways, based on the relative vertical and horizontal dimensions of the edge-detected image (514), based on fixed percentages, (e.g., five to fifteen percent), or based on preset box sizes (e.g., five pixels by five pixels). Preset box sizes provide predictable results if the image is size is normalized by downscaling (as discussed above), either before processing or after the analysis boundary 512 is defined. Tiered preset box sizes may be defined for tiered image sizes (e.g., five-by-five pixels for images one hundred pixels tall or less, ten-by-ten pixels for images between one hundred and two hundred pixels tall, etc.).

The border patches 518 (along the left, right, top and bottom periphery) of the edge-detected image (514) are analyzed (436) to compute the percentage of pixels within each patch 518 that belong to a detected edge. If this percentage is above a second threshold $R_2$ (438 "No") for any of the patches 518, then no further orientation estimation is performed (i.e., stop 440). In the alternative to stopping 440, a different orientation technique may be invoked, such as the prior art approach of first determining the location of text and then identifying orientation. Otherwise (438 "Yes"), the process proceeds as described in connection with FIGS. 1 and 2. The efficacy of the process in FIG. 4 is based on the assumption that most edge clutter is generated by non-text related edges, such as trees, which are typically found along the borders of the image. If there is a very high density of edges detected along the periphery, the lines produced by the Hough transform prior to text detection are more likely to produce an incorrect estimation of orientation, making the estimate unreliable.

Figure 6:
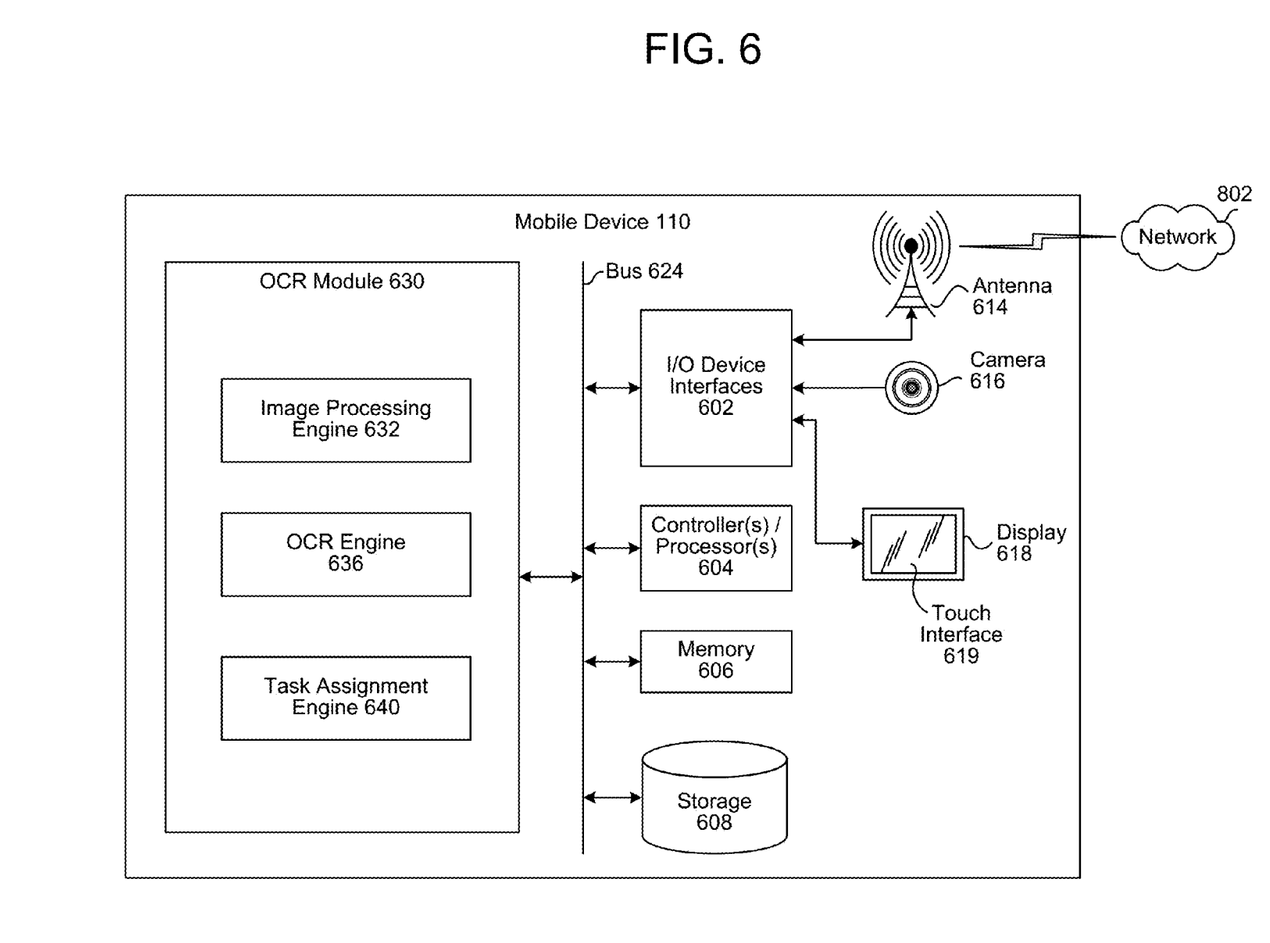
FIG. 6 is a block diagram conceptually illustrating example components of a mobile device of the system in FIG. 1.

FIG. 6 is a block diagram conceptually illustrating example components of the mobile device 110 of the system 100. In operation, the device 110 may include computer-readable and computer-executable instructions that reside on the device 110, or that may reside on a network-connected device operating in conjunction with device 110, as will be discussed further below.

As illustrated in FIG. 6, the device 110 may include wireless network radio connectivity (e.g., antenna 614), a camera (616), a display 618, and a user interface such as touch interface 619. "Camera" includes image capture systems used to capture images, and includes (among other things), cameras used for photography and for the capture of video. Image scanners such as flat-bed optical scanners may be substituted for a camera to capture the image 111/311/511.

The display 618 may be a display of any suitable technology, such as a liquid crystal display, an organic light emitting diode display, electronic paper, an electrochromic display, or other suitable component(s). The cameras 616, display 618, and other components may be integrated into the device 110, or may be separate, connected to the device 110 by a wired or wireless connection.

The device 110 may include an address/data bus 624 for conveying data among components of the device 110. Each component within the device 110 may also be directly connected to other components in addition to (or instead of) being connected to other components across the bus 624.

The device 110 may include one or more controllers/processors 604, that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The device 100 may also include a data storage component 608, for storing data and controller/processor-executable instructions (e.g., instructions to perform the processes discussed in connection with FIGS. 1, 2, and 4). The data storage component 608 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 602.

Computer instructions for operating the device 110 and its various components (such as the engines 632, 636, and 640 of the OCR module 630) may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The device 110 includes input/output device interfaces 602. A variety of components may be connected through the input/output device interfaces 602, such as the display 618, a speaker (not illustrated), a microphone (not illustrated), and the user interface (e.g., touch interface 619). The input/output device interfaces 602 may also include an interface for an external peripheral device connection such as universal serial bus (USB), Thunderbolt or other connection protocol. The input/output device interfaces 602 may also include a connection to one or more networks 802 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 802, the system 100 may be distributed across a networked environment, as will be discussed further below with FIG. 8.

The device 110 further includes an OCR module 630 that utilizes the orientation estimation techniques described in connection with FIGS. 1, 2, and 4, and/or works in conjunction with another device in the system 100. For example, a first device 110 may include the camera 616 and capture the image 111/311/511, whereas a second device 110 (or a support device 112 such as a server) includes all or part of the OCR module 630 that processes the captured image.

The OCR module 630 includes an image processing engine 632. Among other things, the image processing engine 632 defines the analysis boundary 230, performs edge-detection 234, determine characteristics of content along the image borders (120), estimates text orientation (122), and rotates the image based on the estimated orientation (124). Image pre-processing, greyscale conversions, and downscaling may also be performed by the image processing engine 632.

An optical character recognition (OCR) engine 636 of the OCR module 630 may detect and recognize (126) text in the rotated image. Any OCR algorithm or algorithms may be used, as known in the art.

Text detection (126) and binarization (227) may be performed by either the image processing engine 632 or the OCR engine 636, depending in part on how tasks are divided and the capabilities of the OCR engine 636, as some OCR process pipelines include text detection and binarization.

Figure 7:
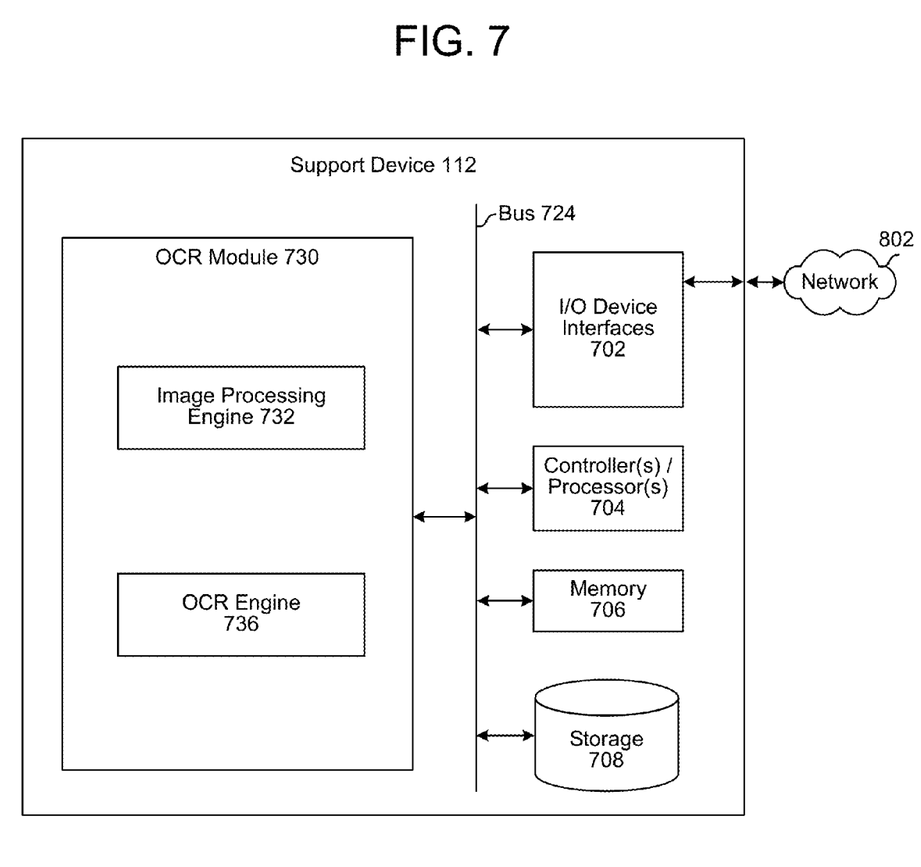
FIG. 7 is a block diagram conceptually illustrating example components of a network-connected support device of the system in FIG. 1.

How tasks are divided between the mobile device 110 and the support device 112 may be determined dynamically by task assignment engine 640 of the OCR module 630. The task assignment engine 640 may determine a speed of the connection via network 802 to the support device 112. Based on criteria such as the speed of the network connection, the computational complexity of the process steps, and the computational capabilities of the controller(s)/processor(s) 604, the task assignment engine 640 may apply load balancing heuristics to dynamically divide processing steps between the other engines of the OCR module 630 of the mobile device 110 and an OCR module 730 of the support device 112. For example, the task assignment engine 640 may assign everything to the image processing engine 632 on the mobile device 110, except OCR, which is assigned to an OCR engine 736 on the support device 736. Task assignments to the support device 112 may include the image data, an instruction on the task or tasks to be performed, and an instruction to send the result back to the mobile device 110, where the result may be used and/or output. Task assignments may be made before starting the process, of made dynamically during processing based on resource availability.

FIG. 7 is a block diagram conceptually illustrating example components of the support device 112 of the system 100. While some mobile devices 110 that capture the image 111/311/511 may be able to execute their own processing pipeline, the task assignment engine 640 of the mobile device 110 may delegate some tasks to the network-connected support device 112 to process the captured image (e.g., delegating image rotation (124) and/or text detection and recognition (126) to the support device 112). In operation, the support device 112 may include computer-readable and computer-executable instructions that reside on the server 112.

The support device 112 may include an address/data bus 724 for conveying data among components of the support device 112. Each component within the support device 112 may also be directly connected to other components in addition to (or instead of) being connected to other components across the bus 724.

The support device 112 may include one or more controllers/processors 704, that may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The support device 112 may also include a data storage component 708, for storing data and controller/processor-executable instructions (e.g., instructions to perform the processes discussed in connection with FIGS. 1, 2, and 4). The data storage component 708 may include one or more non-volatile storage types such as magnetic storage, optical storage, solid-state storage, etc. The support device 112 may also be connected to removable or external non-volatile memory and/or storage (such as a removable memory card, memory key drive, networked storage, etc.) through the input/output device interfaces 702.

Computer instructions for operating the support device 112 and its various components (such as the engines 732 and 736 of the OCR module 730) may be executed by the controller(s)/processor(s) 704, using the memory 706 as temporary "working" storage at runtime. The computer instructions may be stored in a non-transitory manner in non-volatile memory 706, storage 708, or an external device. Alternatively, some or all of the executable instructions may be embedded in hardware or firmware in addition to or instead of software.

The support device 112 includes input/output device interfaces 702. A variety of components may be connected through the input/output device interfaces 702. The input/output device interfaces 702 may also include an interface for an external peripheral device connection such as universal serial bus (USB), Thunderbolt or other connection protocol. The input/output device interfaces 702 may also include a connection to one or more networks 802 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 802, the system 100 may be distributed across a networked environment, as will be discussed further below with FIG. 8.

The support device 112 further includes an OCR module 730 that utilizes the orientation estimation techniques described in connection with FIGS. 1, 2, and 4, and/or works in conjunction with the mobile device 110.

The OCR module 730 includes an image processing engine 732. Among other things, the image processing engine 632 defines the analysis boundary 230, performs edge-detection 234, determine characteristics of content along the image borders (120), estimates text orientation (122), and rotates the image based on the estimated orientation (124). Image pre-processing, greyscale conversions, and downscaling may also be performed by the image processing engine 732.

An optical character recognition (OCR) engine 736 of the OCR module 730 may detect and recognize (126) text in the rotated image. Any OCR algorithm or algorithms may be used, as known in the art.

Text detection (126) and binarization (227) may be performed by either the image processing engine 732 or the OCR engine 736, depending in part on how tasks are divided and the capabilities of the OCR engine 736, as some OCR process pipelines include text detection and binarization.

The components of the mobile device 110 as illustrated in FIG. 6 and the support device 112 as illustrated in FIG. 7 are exemplary, and may be a stand-alone device or may be included, in whole or in part, as a component of a larger device or system.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Figure 8:
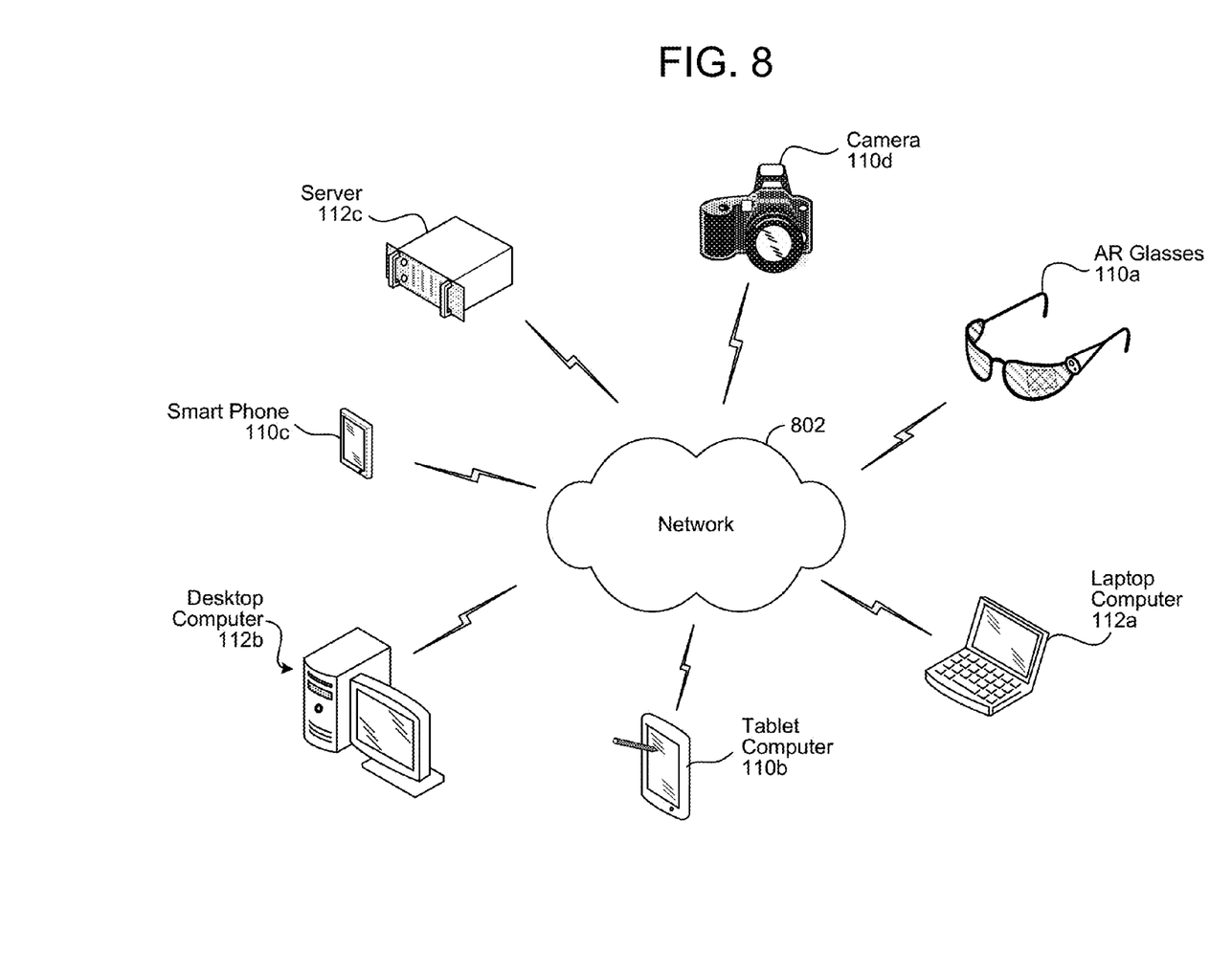
FIG. 8 illustrates an example of a computer network for use with the system in FIG. 1.

As illustrated in FIG. 8, multiple mobile devices (110a to 110c) may contain components of the system 100 and the devices may be connected over a network 802. Network 802 may include a local or private network or may include a wide network such as the internet. Devices may be connected to the network 802 through either wired or wireless connections. For example, augmented reality (AR) glasses 110a, a tablet computer 110b, a smart phone 110c, and a camera 110d may be connected to the network 802 through a wireless service provider, over a WiFi or cellular network connection or the like. Other devices are included as network-connected support devices 112, such as a laptop computer 112a, a desktop computer 110b, and a server 112c. The support devices 112 may connect to the network 802 through a wired connection or wireless connection. Networked mobile devices 110 may capture images using one-or-more built-in or connected cameras 616 or image capture devices, with processing performed by a OCR module 630 of the same device or another device connected via network 802, such as a support device 112.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the OCR modules 630 and 730 may be implemented as firmware in hardware. For example, portions of the image processing engine 632 and 732 of the OCR modules 630 and 730 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for rotating and processing text in an image, the method comprising:
   detecting edges in the image;
   estimating lines by applying a Hough transform to the detected edges;
   determining a length and an angle of each of the estimated lines;
   assigning each estimated line to a discrete angle of a plurality of discrete angles based on the angle of the respective line;
   determining a sum of lengths of lines assigned to each discrete angle;
   determining a first discrete angle of the plurality of discrete angles that is associated with a largest determined sum;
   determining a weighted sum angle based on a sum of the length of the lines assigned to the first discrete angle, a sum of the length of lines assigned to a first neighboring discrete angle smaller than the first discrete angle, and a sum of the length of lines assigned to a second neighboring discrete angle larger than the first discrete angle;
   rotating the image based on the weighted sum angle;
   detecting text in the rotated image; and
   performing optical character recognition on the detected text.

2. The method of claim 1, further comprising:
   selecting a region of the image, wherein the region is adjacent to a border of the image;
   determining a percentage of pixels corresponding to the detected edges within the region; and
   determining that the percentage is less than a threshold value.

3. The method of claim 1, further comprising:
   determining that the first discrete angle does not correspond to zero degrees;
   determining a ratio of a sum of the lengths of lines assigned to the first discrete angle, the first neighboring angle, and the second neighboring angle to a sum of lines assigned to the discrete angle that includes zero degrees; and
   determining that the ratio is greater than a threshold value.

4. A computing device comprising:
   at least one processor;
   a memory including instructions operable to be executed by the at least one processor to configure the at least one processor to:
      detect a plurality of edges in the image;
      determine, based on the plurality of edges, a first line;
      determine, based on the plurality of edges, a second line;
      determine a first angle of the first line;
      determine a second angle of the second line;
      associate, based on the first angle, the first line with a first bin, the first bin associated with a first range of angles;
      associate, based on the second angle, the second line with a second bin, the second bin associated with a second range of angles;
      determine, for the first bin, a first sum of lengths of lines associated with the first bin;
      determine, for the second bin, a second sum of lengths of lines associated with the second bin;
      determine that the first sum is greater than the second sum;
      determine a first discrete angle associated with the first bin;
      rotate the image based at least in part on the first discrete angle; and
      detect text in the rotated image.

5. The computing device of claim 4, the instructions further configuring the at least one processor to apply a Hough transform to detected edges in the image.

6. The computing device of claim 4, the instructions further configuring the at least one processor to:
   determine a third sum of lengths of lines associated with a third bin, the third bin associated with a third range of angles, the third range of angles neighboring the first range of angles;
   determine a fourth sum of lengths of lines associated with a fourth bin, the fourth bin associated with a fourth range of angles, the fourth range of angles neighboring the first range of angles;
   determine a weighted sum angle based on the first sum of lengths, the third sum of lengths and the fourth sum of lengths; and
   rotate the image based further at least in part on the weighted sum angle.

7. The computing device of claim 6, the instructions further configuring the at least one processor to:
   determine that the first discrete angle does not correspond to zero degrees prior to determining the weighted sum angle.

8. The computing device of claim 4, the instructions further configuring the at least one processor to:
   binarize the detected text in the rotated image;
   perform optical character recognition on the binarized detected text.

9. The computing device of claim 4, further comprising a communications interface, the instructions further configuring the at least one processor to:
   binarize the detected text in the rotated image;
   transmit the binarized detected text to a second device via the communications interface with an instruction to perform optical character recognition on the binarized detected text; and
   receive recognized text from the second device via the communication interface.

10. The computing device of claim 4, the instructions further configuring the at least one processor to:
    select a region of the image, wherein the region is adjacent to a border of the image;
    determine a percentage of pixels corresponding to the detected edges within the region; and
    determine that the percentage is less than a threshold value.

11. The computing device of claim 4, the instructions further configuring the at least one processor to:
    downscale the image; and
    crop the downscaled image,
    wherein the estimated orientation of text in the image is based on the cropped downscaled image.

12. A non-transitory computer-readable storage medium storing processor-executable instructions for controlling a computing device, to configure the computing device to:
    detect a plurality of edges in the image;
    determine, based on the plurality of edges, a first line;
    determine, based on the plurality of edges, a second line;
    determine a first angle of the first line;
    determine a second angle of the second line;
    associate, based on the first angle, the first line with a first bin, the first bin associated with a first range of angles;
    associate, based on the second angle, the second line with a second bin, the second bin associated with a second range of angles;
    determine, for the first bin, a first sum of lengths of lines associated with the first bin;

determine, for the second bin, a second sum of lengths of lines associated with the second bin;

determine that the first sum is greater than the second sum;

determine a first discrete angle associated with the first bin;

rotate the image based at least in part on the first discrete angle; and detect text in the rotated image.

13. The non-transitory computer-readable storage medium of claim 12, the instructions further configuring the computing device to apply a Hough transform to detected edges in the image.

14. The non-transitory computer-readable storage medium of claim 12, the instructions further configuring the computing device to:

determine a third sum of lengths of lines associated with a third bin, the third bin associated with a third range of angles, the third range of angles neighboring the first range of angles;

determine a fourth sum of lengths of lines associated with a fourth bin, the fourth bin associated with a fourth range of angles, the fourth range of angles neighboring the first range of angles;

determine a weighted sum angle based on the first sum of lengths, the third sum of lengths and the fourth sum of lengths; and rotate the image based further at least in part on the weighted sum angle.

15. The non-transitory computer-readable storage medium of claim 14, the instructions further configuring the computing device to:

determine that the first discrete angle does not correspond to zero degrees prior to determining the weighted sum angle.

16. The non-transitory computer-readable storage medium of claim 12, the instructions further configuring the computing device to:

binarize the detected text in the rotated image;

perform optical character recognition on the binarized detected text.

17. The non-transitory computer-readable storage medium of claim 12, the instructions further configuring the computing device to:

binarize the detected text in the rotated image;

transmit the binarized detected text to a second device via a communications interface with an instruction to perform optical character recognition on the binarized detected text; and receive recognized text from the second device via the communication interface.

18. The non-transitory computer-readable storage medium of claim 12, the instructions further configuring the computing device to:

select a region of the image, wherein the region is adjacent to a border of the image;

determine a percentage of pixels corresponding to the detected edges within the region; and determine that the percentage is less than a threshold value.

19. The non-transitory computer-readable storage medium of claim 12, the instructions further configuring the computing device to:

downscale the image; and crop the downscaled image, wherein the estimated orientation of text in the image is based on the cropped downscaled image.

* * * * *